(12) United States Patent
Fredriksson et al.

(10) Patent No.: US 8,136,834 B2
(45) Date of Patent: Mar. 20, 2012

(54) MOTOR VEHICLE SEAT

(75) Inventors: Rikard Fredriksson, Falköping (SE);
Ralf Zauritz, Holzkirchen (DE);
Frederic Charpentier, Le Vaurourx (FR)

(73) Assignee: Autoliv Development AB, Vargarda (SE)

( * ) Notice: Subject to any disclaimer, the term of this patent is extended or adjusted under 35 U.S.C. 154(b) by 90 days.

(21) Appl. No.: 12/679,416

(22) PCT Filed: Sep. 10, 2008

(86) PCT No.: PCT/EP2008/007399
§ 371 (c)(1),
(2), (4) Date: Mar. 22, 2010

(87) PCT Pub. No.: WO2009/039955
PCT Pub. Date: Apr. 2, 2009

(65) Prior Publication Data
US 2010/0207363 A1 Aug. 19, 2010

(30) Foreign Application Priority Data
Sep. 24, 2007 (DE) .......................... 10 2007 045 550

(51) Int. Cl.
*B60R 21/207* (2006.01)
(52) U.S. Cl. ............. 280/730.2; 297/216.1; 297/216.13; 297/284.6; 297/284.9
(58) Field of Classification Search ............... 280/730.2; 297/216.1, 216.13, 284.1, 284.4, 284.6, 284.9
See application file for complete search history.

(56) References Cited

U.S. PATENT DOCUMENTS

| | | | |
|---|---|---|---|
| 6,203,105 B1 * | 3/2001 | Rhodes, Jr. | 297/284.6 |
| 6,302,431 B1 | 10/2001 | Sasaki et al. | |
| 7,125,043 B2 | 10/2006 | Amamori | |
| 2003/0023363 A1 * | 1/2003 | Katz et al. | 701/49 |
| 2007/0200323 A1 * | 8/2007 | Bertele et al. | 280/730.2 |
| 2009/0008913 A1 * | 1/2009 | Breuninger et al. | 280/730.2 |
| 2010/0090448 A1 * | 4/2010 | Pursche et al. | 280/730.2 |

FOREIGN PATENT DOCUMENTS

DE 35 05 088 C1 11/1986
DE 38 29 368 A1 3/1990
(Continued)

OTHER PUBLICATIONS

International Search Report PCT/EP 2008/007399 (WO 2009/039955 A1).

*Primary Examiner* — Ruth Ilan
(74) *Attorney, Agent, or Firm* — Brinks Hofer Gilson & Lione

(57) ABSTRACT

The invention relates to a motor vehicle seat (1) having an upholstered component (3) which is covered by flexible covering (4), and a safety device which is arranged in the upholstered component (3) and has an airbag (5) which is coupled to a gas generator (6). The gas generator (6) is activated when sensor data relating to an accident or an imminent accident are present to inflate the airbag (5) with gas and unfold the airbag. An activator (8) is provided by means of which the airbag (5) or separate gas cushion (7) can be additionally repeatedly inflated with gas in a reversible fashion. The covering (4) is of an inelastic design, at least in certain areas, and has an elastic section (9) which is arranged in the covering (4).

15 Claims, 2 Drawing Sheets

FOREIGN PATENT DOCUMENTS

| | | |
|---|---|---|
| DE | 196 43 435 A1 | 5/1997 |
| DE | 200 01 684 U1 | 4/2000 |
| DE | 199 50 702 A1 | 4/2001 |
| DE | 697 09 778 T2 | 8/2002 |
| DE | 103 45 834 A1 | 4/2005 |
| DE | 10 2004 012 829 B3 | 6/2005 |
| DE | 10 2005 059 997 A2 | 6/2007 |
| DE | 10 2006 005 137 A1 | 8/2007 |
| EP | 1140572 B1 | 10/2001 |
| GB | 1319389 A | 6/1973 |
| WO | WO 98/38067 A1 | 9/1998 |
| WO | WO 2005/092673 A2 | 10/2005 |

* cited by examiner

MOTOR VEHICLE SEAT

CROSS REFERENCE TO RELATED APPLICATIONS

This application claims priority to PCT patent application PCT/EP2008/007399 filed Sep. 10, 2008 and German patent application DE 10 2007 045 550.1 filed Sep. 24, 2007.

FIELD OF THE INVENTION

The present invention relates to a motor vehicle seat having an upholstered component that is covered by flexible covering, and a safety device that is arranged in the upholstered component and which has an airbag.

BACKGROUND OF THE INVENTION

Motor vehicle seats are increasingly equipped with functions which increase the comfort and the safety of the users of the seats. For example, it is possible to inflate air cushions in the side elements of the motor vehicle seat, such as in back rest or in the seat cushions, as a function of the respective driving situation. While cornering, it is possible to inflate the particular seat side element which is arranged in the outer radius of a bend in the seat so as to cause the user or occupant of the seat to be secured better to the seat. Furthermore, the air cushions can be designed to increase the seating comfort and to adapt the contour of the seat to the occupant of the seat.

DE 10 2005 059 997 A1 discloses a safety device in a motor vehicle seat in which an airbag which can be inflated by means of a gas generator is also coupled to an activator which can repeatedly inflate the airbag with gas in a reversible fashion. By virtue of the arrangement of the airbag in the side element it is possible for an occupant to be better secured to the seat when the volume of the airbag is increased by the activator. The side element of the seat is increased in size and is moved in the direction of the occupant of the seat. In the case of an accident, a gas generator is activated and causes the airbag to emerge from the motor vehicle seat so that the airbag can extend between the occupant of the seat and the structure of the vehicle.

EP 1 140 572 B1 discloses a motor vehicle seat with an upholstered seat component in which an airbag is inflated in the event of an accident and at the same time ruptures the covering material at a connecting seam between two blanks of the covering material. Between these blanks of covering material, a strip of a fabric material is inserted which permits the side element of the seat to increase in size. Instead of a freely unfolded airbag, the side elements which project beyond the backrest of the seat or the seat cushion are inflated tautly so that the protruding part of the side elements is increased. Within the side elements, relatively positionally stable air cushions are used and by means of the air cushions a vehicle occupant is cushioned with respect to intruding objects and is stabilized in a desired sitting position. With such an embodiment, only a limited increase in the volume of the side elements is possible.

SUMMARY OF THE INVENTION

In at least one embodiment of the present invention, a motor vehicle seat is provided having a relatively high level of safety in addition to a comfort function and pre-crash function. The motor vehicle seat has an upholstered element which is covered with a flexible covering. A safety device is arranged in the upholstered element and has an airbag which is coupled to a gas generator which is activated when sensor data relating to an accident or an imminent accident are present and inflates the airbag with gas or unfolds it. The safety device has an activator by means of which the airbag or a separate air cushion can additionally be inflated repeatedly with gas in a reversible fashion. The covering is of inelastic design, at least in certain areas, and an elastic section is arranged in the covering or the covering is fixed to a seat frame with at least one elastic strap. Preferably, the seat coverings are flexible in order to adapt themselves to the different loads from the various occupants of seats. In addition to flexibility, the conventional seat coverings are of elastic design in order to be able to follow changes in volume.

However, the elasticity may have the disadvantage that the stability, in particular the lateral guidance, is reduced. Likewise, the deployment of the airbag may be slowed down when the entire covering material is of elastic design and must be fully stretched before the covering material ruptures or breaks open. This delay can be a disadvantage for the safety of the vehicle occupant, in particular in the case of a side impact. With the embodiment of the present invention having a flexible but inelastic covering with an elastic section, it is possible to permit limited resilience of the covering material so that relatively small changes in volume occur for adaptations and comfort, and relatively large changes in volume become possible in order to improve the securing of a vehicle occupant to a seat in a pre-crash situation, without delays in the deployment and unfolding of an airbag occurring in the event of an accident. The flexible seat covering with an elastic section permits sufficient resilience for relatively small changes in volume without the rest of the covering losing strength and stability. The covering material outside the elastic sections can have increased strength so that the entire seat can be upholstered in a more taut and solid fashion (e.g. firm or tightened fashion). Such increased strength and/or stiffness is not counter to the function since it is possible for the change in volume to be compensated for by the resilient, elastic region of the seat covering. In the case of the level of comfort for adaptability the seat to the body contour, only a small degree of stretching of the elastic section will take place so that the elastic section is not loaded to a maximum degree. Preferably, when a pre-crash scenario occurs the airbag or a separate gas cushion be inflated to such a degree that the maximum elasticity of the elastic section is reached so that in the event of an accident scenario, after the gas generator is fired, the airbag or gas cushion will have a non-resilient covering which ruptures easily and permits the airbag to unfold quickly.

In one aspect of the present invention, the elastic section is arranged on a side of the upholstered element which faces the occupant of the seat, in order to make available sufficient flexibility and elasticity of the seat.

The elastic section is preferably dimensioned in such a way that a reversible increase in the volume of the airbag or of the separate gas cushion is compensated, in which case the reversible increase in the volume can occur both in a comfort region and in a pre-crash region. If the upholstered element is to be made more taut, the elasticity of the elastic element can be selected such that a change in length does not occur until a pre-crash scenario occurs, that is when a higher internal pressure is applied to the airbag or the separate gas cushion than for a comfort function.

The airbag is embodied in particular as a side airbag and is arranged in a side element of a seat back rest or seat cushion. In one aspect, the airbag is arranged preferably on a side of the upholstered element which faces away from the user of the seat, for example on the outside of a seat frame or of a seat cushion frame.

In order to facilitate the deployment or emergence of the airbag in the event of an accident, a predetermined rupture point or a predetermined rupture seam, which is weaker than that of the covering, may be arranged in the covering. As a result, a rupture force at which the predetermined rupture point fails and the airbag can emerge is defined. This facilitates the determination and design of the airbag and of the gas generator.

The activator for reversibly inflating the airbag or the gas cushion is preferably embodied as an electric pump by means of which ambient air is preferably introduced into the airbag or the gas cushion and, if appropriate, also pumped out again. Other pressurized gas storages or storage tanks can also be provided or intermediately connected so that the airbag or the gas cushion can also be inflated indirectly. The storage tank can be made from metal, plastic, and/or reinforced rubber hose, and can comprise a control valve.

For aesthetic reasons, the elastic section may not be arranged or embodied on the motor vehicle seat so as to be visible but rather, for example, may be arranged on a concealed edge of the seat backrest or of the seat cushion.

A restraining strap which prevents the unfolded airbag from moving away from the occupant of the seat can be arranged on the airbag, thus providing an improved association or interaction of the airbag with the occupant of the seat.

The gas cushion can be composed of an elastic material so that after the application of pressure from the inflation gas is stopped, the gas cushion returns to its original state without requiring further measures to be taken. The restoring force of the upholstered element and of the covering assists the return of the gas cushion into its initial or stowed position. Alternatively or additionally, the gas cushion can be secured by means of an elastic strap to the seat frame to provide a sufficient restoring force. The gas cushion is preferably a gas-tight design in order to avoid the need to continuously refill the gas cushion with inflation gas after inflation has occurred.

In one aspect, the airbag can be covered on the outside by a rigid cap which is attached to the seat or within the seat covering. In this way it is possible for the airbag to be easily mounted and made accessible from the outside. Likewise, deployment of the airbag can be facilitated by blowing off the cap. In order to avoid adversely affecting the folding of the airbag, there may be advantageously a provision for the airbag to be accommodated in a shell which is covered by the dimensionally stable cap.

As an alternative to accommodation of the airbag in a shell with a cap, there may be another provision for the airbag to be arranged in a soft sheath in which the airbag is held in terms of its position and its shape.

BRIEF DESCRIPTION OF THE DRAWINGS

The exemplary embodiments of the invention are explained in more detail below with reference to the appended figures, of which.

DETAILED DESCRIPTION OF THE INVENTION

Figure 1:
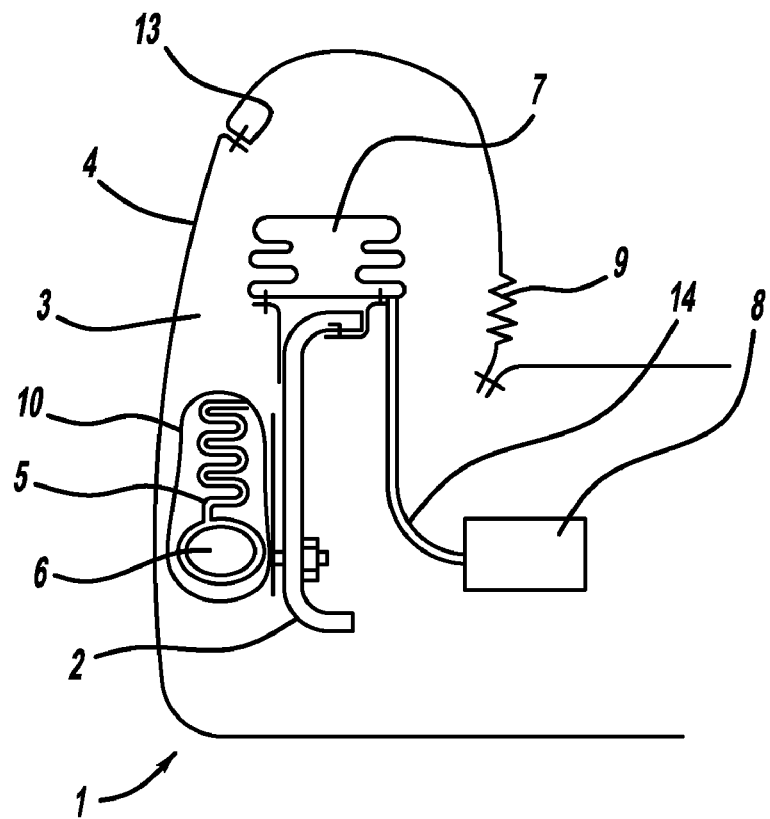
FIG. 1 shows a first variant of one embodiment of the present invention in a partial sectional view in an initial state.

FIG. 1 shows a schematic sectional view of a detail of a motor vehicle seat 1 with a seat frame 2 which can form, for example, part of a seat back rest or of a seat cushion. An upholstered component 3 which is covered by a seat covering 4 is arranged around the seat frame 2. Side elements of the seat, can protrude beyond support surfaces in the direction of travel (e.g. longitudinal direction) or in the vertical direction.

An airbag 5 with a gas generator 6 is arranged to the side next to the seat frame 2. In the present exemplary embodiment, the airbag 5 and the gas generator 6 are positioned on the outside of the seat frame 2, that is to say positioned on the seat frame 2 facing away from the occupant of the seat. The airbag 5 and the gas generator 6 are arranged in a soft sleeve 10 which in particular holds the airbag 5 in the illustrated folded-up position.

Likewise, a gas cushion 7 which is oriented in a forward or upper direction and can be inflated with an inflation gas by means of an activator 8 which is connected to the gas cushion 7 via a connecting line 14 that is also arranged on the seat frame 2. The activator 8 may be configured as an electric pump by means of which ambient air can preferably be pumped into the gas cushion 7 and pumped out of it again, in order to bring about a change in the hardness (e.g. firmness) of the upholstery or to increase the volume of the upholstered component 3 in the region of the side elements or else at other regions of the motor vehicle seat 1.

The covering 4 is composed of a flexible, essentially inelastic material and has, on its outer side, a predetermined rupture seam 13 through which the airbag 5 can emerge and unfold next to the occupant of the seat after the gas generator 6 has been activated. An elastic section 9, which compensates an increase in volume of the gas cushion 7, is formed in the covering 4 or fitted therein on the inner side of the side element of the seat, that is to say on the side of the seat frame 2 lying opposite the airbag 5.

By means of the activator 8, the gas cushion, which is preferably of a gas-tight design and manufactured from an elastic material, can be repeatedly inflated with a previously determined quantity of gas. Inflation can occur, for example, in order to set a degree of hardness of the upholstered component 3 when cornering or else to change the degree or level of hardness within the scope of a massage function. For this first comfort function, only small volumes of gas are pumped into the gas cushion 7. In order to arrive again at the initial state, the gas volume which has been added is pumped out again by the activator 8, which is embodied in particular as an electric pump. For this comfort function, the elastic section 9 does not have to be deflected or elongated since it involves only a small increase in the volume of the gas cushion 7 and thus of the side element of the seat 1.

In a second function, what is referred to as a pre-crash function, a larger volume of gas is pumped into the gas cushion 7 than is used for the comfort function. As a result, the side element of the seat 1 expands and brings about enhanced contact between the seat 1 and the occupant of the seat. The side elements also become larger or the upholstered element becomes harder so that better lateral guidance and greater tautness of the entire motor vehicle seat 1 is brought about. In order to be able to carry out this increase in volume with the essentially inelastic, flexible seat covering 4, the elastic section 9 becomes longer to such a degree that the volume of the gas cushion 7 is increased. This pre-crash function causes the elasticity of the elastic section 9 to be used by elongating the elastic section 9.

If an accident does not occur after a pre-crash scenario, the gas volume in the gas cushion 7 is reduced or let out completely. Owing to the elasticity of the elastic section 9, the upholstered seat element 3 and the gas cushion 7 then return to their respective initial positions. Since such pre-crash scenarios occur relatively rarely, the maximum expansion of the elastic element 9 does not lead to an adverse effect on the durability or fatiguing of the seat cover 4. The essentially more frequently activated comfort function can occur when the elastic element 9 is increased in length only slightly or without expansion so that the covering 4 in its entirety is subject to less stress by the comfort function.

If an accident occurs after a pre-crash scenario, the gas generator 6 is activated and inflates the airbag 5. Owing to the elasticity which is no longer present in the covering material 4 or in the elastic section 9 because the elastic section 9 has been substantially elongated, the covering 4 can easily rupture owing to the increase in volume of the airbag 5 when the gas generator 6 is activated, said rupturing occurring in particular in the region of a predetermined rupture seam 13. The predetermined rupture seam 13 breaks open or ruptures immediately and therefore the airbag 5 is released and unfolds spontaneously in the desired direction. The airbag 5 can be attached to the seat frame 2 with a retaining strap 16 in order to provide a certain degree of stability and orientation in the direction of the occupant of the seat.

Figure 2:
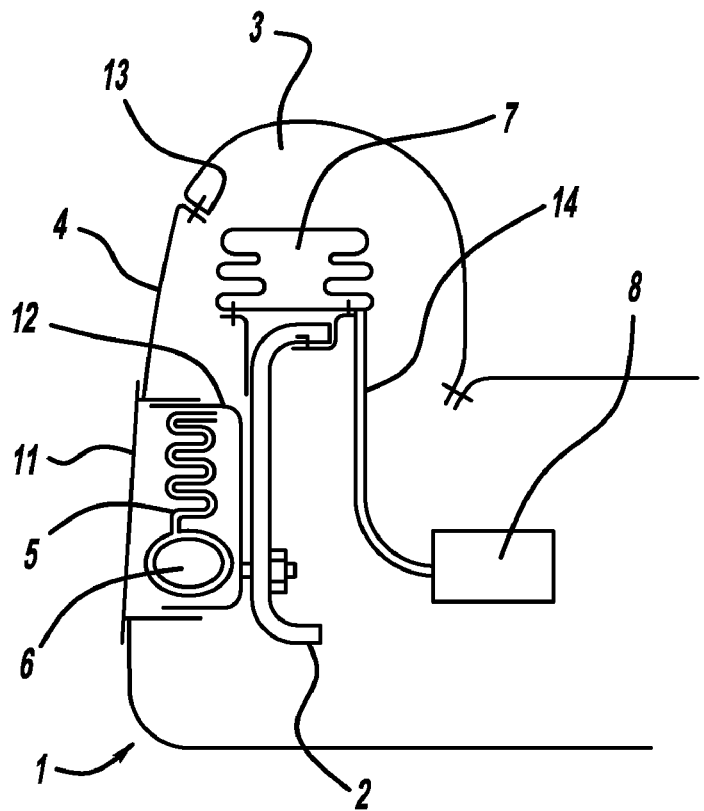
FIG. 2 shows a variant from FIG. 1 in a pre-crash scenario.

FIG. 2 illustrates a variant of the embodiment illustrated in FIG. 1. The elastic section 9 is extended or elongated completely here since the gas cushion 7 has been inflated with a gas by the activator 8. Instead of a soft sleeve 10, as shown in FIG. 1, the airbag 5 and the gas generator 6 are covered from the outside by a rigid cap 11. The airbag 5 and the gas generator 6 are located in a shell 12 which is surrounded by the cap 11. This cap 11 is a visible cover. The airbag 5 emerges from the cap 11.

Figure 3:
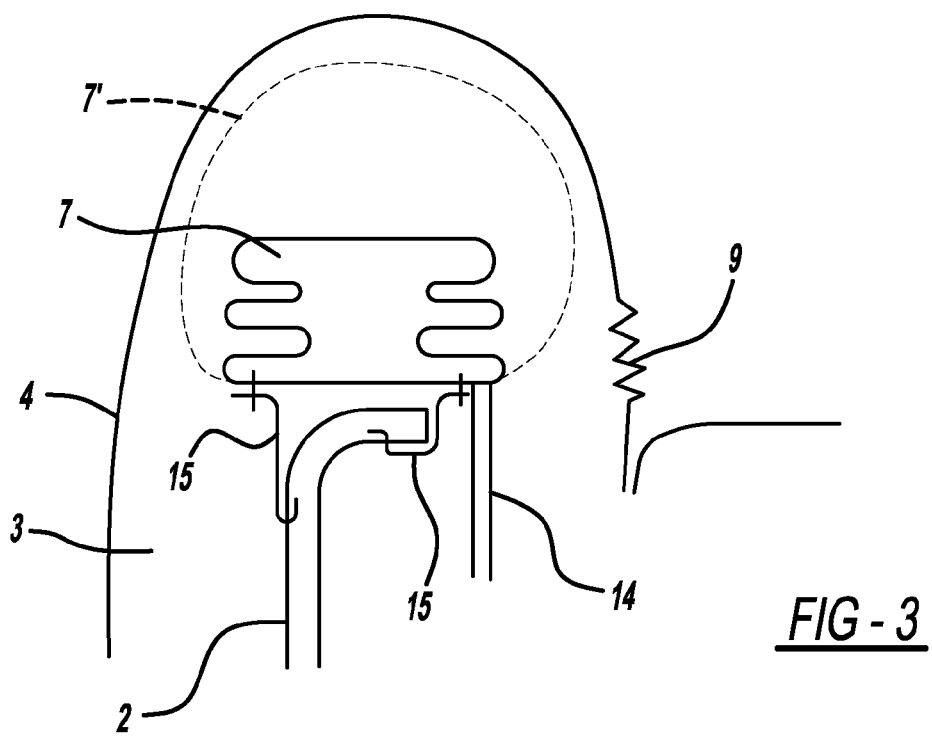
FIG. 3 shows an enlarged illustration of a detail of an initial state in accordance with one embodiment of the present invention.

The motor vehicle seat 1 is shown in the initial position in the region of a side element in FIG. 3. The elastic section 9 of the covering 4 is retracted here since the gas cushion 7 is not inflated with an inflation gas. The dashed line shows the contour of an inflated gas cushion 7'. The gas cushion 7 can be composed of a normal fabric or of a film and is preferably of a gas-tight design. The gas cushion 7 can be attached to the frame 2 by means of elastic straps 15 which are attached to the gas cushion 7, for example by hooking the straps 15 into the frame 2. From FIG. 3 it is apparent that the elastic section 9 is arranged on the inside of the side element, that is to say on the part of the covering 4 facing the occupant of the seat, while the side of the covering 4 which faces away is of flexible and inelastic design so that the side airbag 5 can emerge more easily.

Figure 4:
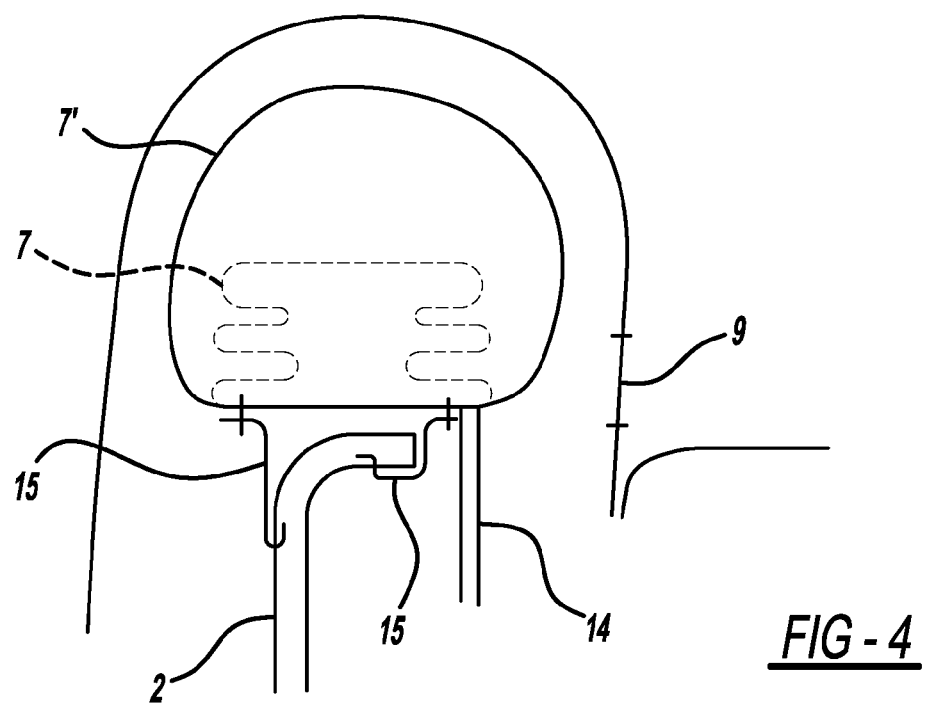
FIG. 4 shows an enlarged illustration of a detail in a pre-crash scenario in accordance with one embodiment of the present invention.

FIG. 4 illustrates the situation with a completely unfolded gas cushion 7', which corresponds to a pre-crash situation.

The elastic section 9 is completely extended so that there is no elastic resilience to be expected when the gas generator 6 is activated.

The elastic section 9 is preferably arranged in such a way that it is formed in the region of a seam on the seat covering 4 so that it cannot be seen. It is also possible to arrange a plurality of elastic sections 9 within the covering if this is desired.

The invention claimed is:

1. A motor vehicle seat having an upholstered component which is covered by flexible covering, the seat comprising: a safety device which is arranged in the upholstered component and has an airbag which is coupled to a gas generator, the gas generator being configured to be activated in response to sensor data relating to an accident or an imminent accident to irreversibly inflate the airbag with gas unfolding the airbag, and an activator configured to additionally repeatedly inflate a gas cushion with gas in a reversible fashion, wherein the covering is of an inelastic design, at least in certain areas, and at least one elastic section is arranged in the covering.

2. The motor vehicle seat according to claim 1, wherein the elastic section is arranged on a side facing an occupant of the seat.

3. The motor vehicle seat according to claim 1, wherein the elastic section is dimensioned to allow a reversible increase in the volume the gas cushion.

4. The motor vehicle seat according to claim 1, wherein the airbag is configured as a side airbag.

5. The motor vehicle seat according to claim 1, wherein the airbag is arranged on a side of the upholstered component to face away from an occupant of the seat.

6. The motor vehicle seat according to claim 1, wherein a predetermined rupture point or predetermined rupture seam is arranged in the covering.

7. The motor vehicle seat according to claim 1, wherein the activator comprises
a storage tank made of metal, plastic, or reinforced rubber hose for compressed air, and
a control valve.

8. The motor vehicle seat according to claim 1, wherein a restraining strap, which prevents the unfolded airbag from moving away from an occupant of the seat, is arranged on the airbag.

9. The motor vehicle seat according to claim 1, wherein the gas cushion is composed of an elastic material.

10. The motor vehicle seat according to claim 1, wherein the airbag is covered by a rigid cap.

11. The motor vehicle seat according to claim 10, wherein the airbag is accommodated in a shell.

12. The motor vehicle seat according to claim 1, wherein the airbag is arranged in a soft sleeve.

13. The motor vehicle seat according to claim 1, wherein the gas cushion is secured to the seat frame by means of at least one elastic strap.

14. The motor vehicle seat according to claim 1, wherein the gas cushion is of a gas-tight design.

15. The motor vehicle seat according to claim 1, wherein the activator is configured as an electric pump.

* * * * *

UNITED STATES PATENT AND TRADEMARK OFFICE
CERTIFICATE OF CORRECTION

| | | |
|---|---|---|
| PATENT NO. | : 8,136,834 B2 | Page 1 of 1 |
| APPLICATION NO. | : 12/679416 | |
| DATED | : March 20, 2012 | |
| INVENTOR(S) | : Rikard Frederiksson et al. | |

It is certified that error appears in the above-identified patent and that said Letters Patent is hereby corrected as shown below:

In the Claims

In claim 3, column 6, line 25, after "volume", insert --of--.

Signed and Sealed this
Fifteenth Day of May, 2012

David J. Kappos
*Director of the United States Patent and Trademark Office*